(12) United States Patent
Schmidt

(10) Patent No.: US 8,375,217 B2
(45) Date of Patent: Feb. 12, 2013

(54) PROCESS AND DEVICE FOR THE PACKET-ORIENTED TRANSMISSION OF SECURITY-RELEVANT DATA

(75) Inventor: Joachim Schmidt, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 403 days.

(21) Appl. No.: 10/825,583

(22) Filed: Apr. 15, 2004

(65) Prior Publication Data

US 2005/0010762 A1 Jan. 13, 2005

(30) Foreign Application Priority Data

Apr. 17, 2003 (DE) .................................. 103 18 068

(51) Int. Cl.
*H04L 9/32* (2006.01)
*G05B 11/01* (2006.01)
*H03M 13/00* (2006.01)
*H04L 1/18* (2006.01)

(52) U.S. Cl. .......... 713/181; 700/78; 714/751; 714/752; 714/758

(58) Field of Classification Search .................. 713/160, 713/151, 180, 181; 714/751, 752, 758; 700/78
See application file for complete search history.

(56) References Cited

U.S. PATENT DOCUMENTS

| | | | | |
|---|---|---|---|---|
| 5,132,975 A * | 7/1992 | Avaneas | ........................ | 714/757 |
| 5,194,995 A * | 3/1993 | Severtson et al. | ................ | 360/48 |
| 5,341,384 A * | 8/1994 | Miya et al. | ..................... | 714/747 |
| 5,592,487 A * | 1/1997 | Knecht et al. | ................. | 370/473 |
| 5,608,738 A | 3/1997 | Matsushita | ................... | 371/37.1 |
| 6,078,785 A * | 6/2000 | Bush | ................................. | 455/7 |
| 6,445,717 B1 | 9/2002 | Gibson et al. | .................. | 370/473 |
| 6,445,964 B1 * | 9/2002 | White et al. | ...................... | 700/61 |
| 6,516,435 B1 * | 2/2003 | Tsunoda | ....................... | 714/751 |
| 6,556,588 B2 * | 4/2003 | Wan et al. | ..................... | 370/474 |
| 6,574,770 B1 | 6/2003 | Daudelin | ...................... | 714/776 |
| 6,624,532 B1 * | 9/2003 | Davidow et al. | ................. | 307/39 |
| 6,675,340 B1 * | 1/2004 | Hardie et al. | .................. | 714/751 |
| 6,701,480 B1 * | 3/2004 | Karpuszka et al. | ........... | 714/764 |

(Continued)

FOREIGN PATENT DOCUMENTS

| | | |
|---|---|---|
| DE | 100 65 907 A1 | 9/2002 |
| JP | 02019946 | 1/1990 |

(Continued)

OTHER PUBLICATIONS

M. Luby et al. RFC 3452: Forward Error Correction (FEC) Building Block. Dec. 2002. p. 1-17.*

(Continued)

*Primary Examiner* — Christian Laforgia
(74) *Attorney, Agent, or Firm* — Ohlandt, Greeley, Ruggiero & Perle, LLP

(57) ABSTRACT

The present invention relates to the packet-oriented transmission of security-relevant data. One task of the invention is the provision of a way for the packet-oriented transmission of security-relevant data ensuring —under the guarantee of a considerably enhanced user data rate —a high level of protection against statistical and systematic errors with an insecure transmission medium. The invention provides, particularly for the use of at least one parallel and/or serial network and/or bus system, a process and devices for the packet-oriented transmission of security-relevant data allowing the transmission of security-relevant data and a redundant information that is based on the data in different packets.

25 Claims, 1 Drawing Sheet

U.S. PATENT DOCUMENTS

| | | | |
|---|---|---|---|
| 6,983,414 B1* | 1/2006 | Duschatko et al. | 714/782 |
| 6,996,712 B1* | 2/2006 | Perlman et al. | 713/161 |
| 7,017,102 B1* | 3/2006 | Kristensson et al. | 714/786 |
| 7,028,249 B2* | 4/2006 | Bruekers et al. | 714/807 |
| 7,228,488 B1* | 6/2007 | Grass et al. | 714/776 |
| 7,249,185 B1* | 7/2007 | Shaffer et al. | 709/228 |
| 7,298,727 B2* | 11/2007 | Kim et al. | 370/342 |
| 7,346,054 B2* | 3/2008 | Chen et al. | 370/390 |
| 2002/0133780 A1* | 9/2002 | Bruekers et al. | 714/781 |
| 2002/0159454 A1* | 10/2002 | Delmas | 370/389 |
| 2003/0005386 A1 | 1/2003 | Bhatt et al. | |
| 2003/0053454 A1* | 3/2003 | Katsavounidis et al. | 370/389 |
| 2003/0200323 A1* | 10/2003 | Dold et al. | 709/230 |
| 2004/0042494 A1* | 3/2004 | Chen et al. | 370/474 |
| 2004/0098652 A1* | 5/2004 | Sternberg et al. | 714/752 |
| 2004/0172207 A1* | 9/2004 | Hancock et al. | 702/60 |
| 2004/0199814 A1* | 10/2004 | Kim et al. | 714/18 |
| 2005/0008103 A1* | 1/2005 | Sternberg et al. | 375/340 |

FOREIGN PATENT DOCUMENTS

| | | |
|---|---|---|
| JP | H03505035 | 10/1991 |
| JP | 2003092564 | 3/2003 |
| WO | WO 00/48052 | 8/2000 |
| WO | WO 01/84731 | 11/2001 |

OTHER PUBLICATIONS

M. Luby et al. RFC 3453: The Use of Forward Error Correction (FEC) in Reliable Multicast. Dec. 2002. p. 1-18.*

Blackmore, Perry A. et al., "Coding Techniques to Improve the Reliability of Emcon Transmissions," Defence Science and Techonology Organisation, Australia, 1996, pp. 447-452.

Lin, Shu et al., "A Hybrid ARQ Scheme with Parity Retransmission for Error Control of Satellite Channels," IEEE Transactions on Communications, vol. Com-30. No. 7, Jul. 1982, pp. 1701-1719.

Lin, Shu, "A Modified Selective-Repeat Type-II Hybrid ARQ System," Dept. of Electrical Engineering, Univ. of Hawaii, Honolulu, HI, 1981, pp. G10.4.1-G10.4.5.

Office Action dated Mar. 13, 2009 corresponding to Chinese Patent Application No. 200410063983.X.

Examiner's Office Letter dated Sep. 2, 2011 corresponding to Japanese Patent Application No. 2009-112834.

International Organisation for Standardisation Organisation Internationale De Normalisation ISO/IEC JTC 1/SC 29/WG 11 Coding of Moving Pictures and Audio, Jul. 2005.

Direct Stream Digital Interchange File Format (DSDIFF), Philips, Apr. 27, 2004.

* cited by examiner

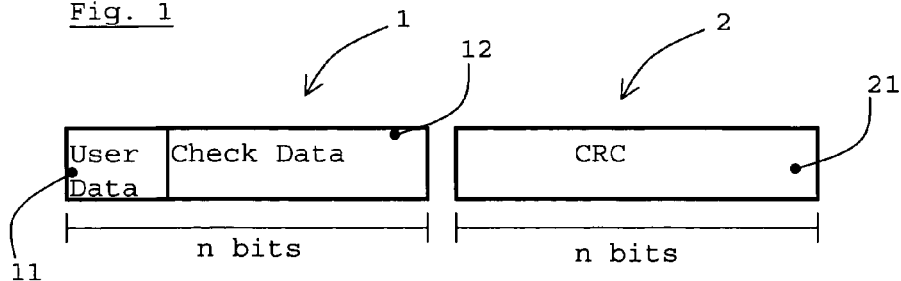
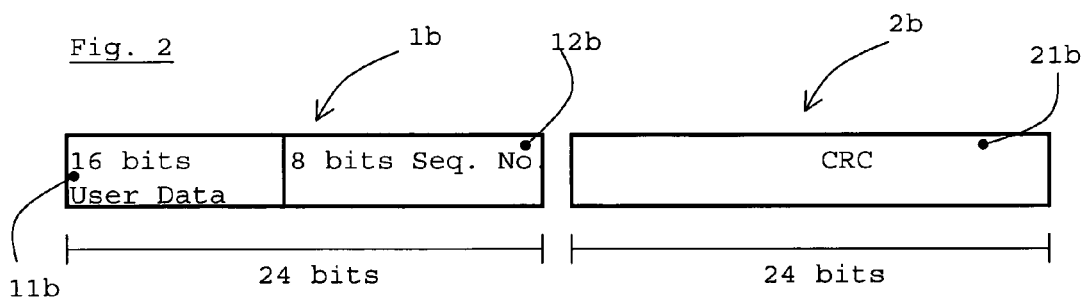
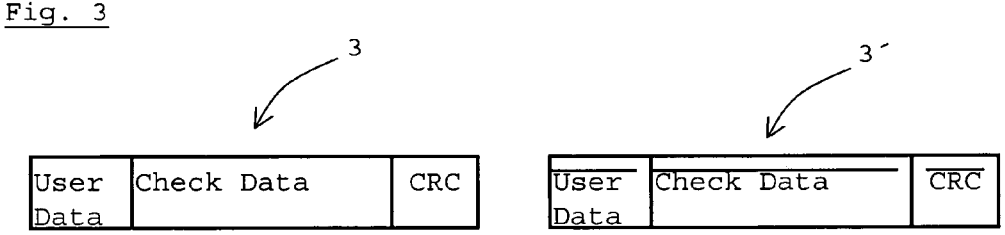

US 8,375,217 B2

PROCESS AND DEVICE FOR THE PACKET-ORIENTED TRANSMISSION OF SECURITY-RELEVANT DATA

CROSS-REFERENCE TO RELATED APPLICATION

The present application claims priority of application serial number 103 18 068.0 filed on Apr. 17, 2003 in Germany.

BACKGROUND OF THE INVENTION

1. Field of the Invention

The invention concerns a process and devices for the packet-oriented transmission of security-relevant data.

2. Description of Related Art

Particularly in the transmission of security-relevant data over an unsecured medium such as, for example, a common network and/or bus system. Such data is usually added a high-grade redundancy so that almost all statistical and systematic errors of the overall transmission system do not have any negative impact on the integrity of the data. As a result, compliance to high security-related requirements with respect to the communication between individual network or bus users is achieved.

As a rule this is done by the extension of the security-relevant data by a data securing value which is generated on the basis of the security-relevant data and added to the security-relevant data of a data packet to be transmitted in accordance with the underlying protocol.

The patent application DE 100 65 907 A1 open to public inspection, for example, reveals a process that is based on the generally known principle of 'redundancy cross referencing'. In this, at the side of the sender, security-relevant data supplied over one or two channels, depending on the type of application, is edited in a twofold manner, i.e., in two data packets, and independently from each other using redundant information and then sent to the recipient over separate connections or time-delayed one after the other over a single connection. Depending on the application the data content of one of the two edited security-oriented data packets may also show inverted data or other additional interleaving to recognize, for example, also systematic errors in the senders, receivers and/or other units involved in the transmission of the data. In addition to this, the mentioned application open to the public provides for a cross-reference verification of the two edited data packets for correctness at the side of the sender and/or receiver by reviewing the respectively added redundancy.

The complete state-of the-art security-oriented message is then, for example, structured as shown in the attached hereto FIG. 3 whereas this security-oriented message comprises two data packets 3 and 3'. According to FIG. 3 the security-relevant data contain—besides the user data as such—additional control data whereas each of the data packets 3 and 3' contains this data with the same information content, but differently coded. In addition to this, each data packet 3 or 3' contains a block of redundant information (CRC or CRC) generated on the basis of the security-relevant data.

A substantial disadvantage of this principally known state-of-the-art process, however, is to be found in particular in the unfavorable relation between the user data length and the overall data length which even gets worse with a decreasing volume of user data to be transmitted per data packet as is, for example, the case with an interbus.

BRIEF SUMMARY OF THE INVENTION

One aim of the invention is thus the task to provide a new and—in relation to the state of the art described above—enhanced way for the packet-oriented transmission of security-relevant data granting a considerably enhanced rate of user data and ensuring a high-quality protection against statistical and systematic errors in an unsecured medium.

The solution of the task according to the invention is in a very surprising manner already given by a process, a device, and a transmission system. The process is for the packet-oriented transmission of security-relevant data under application of at least one transmission system with a parallel and/or serial network and/or bus system with at least one user connected to it. The process includes transmitting the security-relevant data and redundant information based on the security-relevant data. The security-relevant data and the redundant information are transmitted in different packets. The device is for a transmission system with at least one parallel and/or serial network and/or bus system. The device is for the packet-oriented transmission of security-relevant data. The device includes means for the packet-oriented embedding of the security-relevant data and the allocated redundant information into different packets. The means are arranged on the side of the sender. The transmission system includes at least one parallel and/or serial network and/or bus system and at least one device.

According to the invention it is thus provided for the packet-oriented transmission of security-relevant data, particularly under application of at least one transmission system including a parallel and/or serial network and/or bus system with at least one user connected to it that the security-relevant data and a redundant information based on the security-relevant data are transmitted in different packets.

It is thus of considerable advantage that a high protection against statistical and systematic errors, particularly in the case of a transmission over an unsecured medium, can be guaranteed along with a considerably enhanced rate of user data.

For practical reasons, the invention thus provides for the provision of a device for the packet-oriented transmission of security-relevant data between at least two network and/or bus users that has means arranged on the side of the sender for the packet-oriented embedding of security-relevant data and allocated redundant information into different packets and/or means arranged on the side of the receiver designed to verify an error-free transmission of security-relevant data on the basis of security-relevant data and allocated redundant information being embedded in different packets.

The invention thus furthermore allows that only means for the generation, transmission and verification of a single redundant information unit pertaining to each security-relevant data unit are required which leads to a considerable simplification with respect to the processing of data particularly of security-based input and output devices or input and output users of a transmission network and/or bus.

To ensure that essentially all statistical and systematic errors in the transmission system are identified, an encoding device allowing the encoding of the relevant redundant information is provided for.

As a particularly preferred further development, the invention proposes to use a data protection value for the redundant information including a check sum calculated above the security-relevant data.

By using, for example, a polynomial such a check sum can be chosen so that in a particularly preferred way, each of the possible check sums results from one of the possible combinations of the security-relevant data.

The invention thus guarantees an extremely good protection from error bursts as well as from inversion errors with respect to individual components of the security-oriented message to be transmitted as a whole.

According to practical further development, the means arranged on the side of the sender for embedding are allocated driver-like means for the generation of redundant information that show the same number of bits as the security-relevant data to be transmitted. The invention can thus be essentially used in an application-specific way with essentially all currently known networks and/or bus systems as, for example, Interbus, Ethernet, Profibus or CAN.

With the transmission of security-relevant data and allocated redundancy in separate packets according to the invention it is therefore possible to set a high Hamming distance.

As the invention consequently moreover allows to ensure—even for a small volume of user data—high dynamics already on the basis of a single changing bit, a particularly good identification of systematic errors, especially of unsecured network and/or bus users including switches, routers, amplifiers, gateways, system couplers and/or a master can also be guaranteed for the transmission of the data.

Depending on the application-specific used serial and/or parallel networks and/or bus systems, the security-relevant data includes further data, in particular check and/or control data. The security-relevant data includes this further data besides the user data as such, i.e. in particular input/output data and/or other safe process data.

It is further intended to transmit the packets with the allocated to each other security-relevant data and redundant information parallel or serially and/or several packets within a predefined (superset) frame structure so that the invention can be used with the most different applications and/or fields of application. Particularly in the latter case, it is further preferentially proposed to jointly transmit security-relevant data and the allocated redundant information generated on the basis of such data within the predefined structure of a (superset) frame structure to simplify the implementation of the provision of means to read out and verify the security-relevant data and allocated redundant information on the side of the receiver particularly with respect to the allocation functionality.

If the packets with the allocated to each other security-relevant data and redundant information are transmitted separately, a preferred further development provides that the data packets to be transmitted comprise an addressing block and/or an identification code for their logical allocation. As far as the practical execution is concerned, such an addressing and/or identification code is embedded in the data packets to be transmitted by means adapted to the specific application on the side of the receiver based on the respectively used transmission format and verified by correspondingly designed readout means on the side of the receiver to achieve a logical allocation of data packets with contents allocated to each other in order to verify an error-free transmission.

Depending on the invention's field of application which may be found, for example, in the fields of building control technology, process industry, manufacturing industry, passenger transportation and/or the operation of automation plants, and based on the individual structure of the respective network and/or bus system which, in particular, shows a ring-, line-, star- and/or tree-shaped structure, the invention allows the beneficial integration of the aforementioned means implemented on the sides of the sender and receiver in accordance with the invention into essentially every user device, i.e. particularly into master and/or slave users.

BRIEF DESCRIPTION OF THE DRAWINGS

In the following, the invention is described with a preferred design example with reference to the enclosed figures.

FIG. 1 is a block diagram showing the invention-based structure of data packets for the packet-oriented transmission of security-relevant data;

FIG. 2 is a block diagram showing a further invention-based structure to illustrate the considerably enhanced identification of systematic errors; and FIG. 3 is a block diagram showing the structure of a security-oriented message according to the current state of the art.

DETAILED DESCRIPTION OF THE INVENTION

Referring to FIG. 1, an example for a security-oriented message comprising two data packets 1 and 2 to be transmitted according to the invention is shown. This example is for the provision of a packet-oriented transmission of security-relevant data with a guaranteed high rate of user data and, at the same time, at a high-level of protection against statistic and systematic errors.

According to the invention, a security-oriented message of a security-relevant data set—as shown in FIG. 1—principally comprises at least two separate data packets 1 and 2. One data packet 1 comprises security-relevant data and another data packet 2 comprises allocated redundant information.

Based on this structure in accordance with the invention, it is ensured that for a transmission of security-relevant data essentially all statistical and systematic errors are identifiable.

Transmission of the security relevant data is also via an unsecured medium, i.e. essentially via a bus and/or network system, which does not comply with security-oriented standards and/or comprises unsecured system users.

In a data transmission, statistical errors are particularly based on external interference and/or electrical effects, whereas systematic errors are usually caused by software- and/or hardware-based errors of senders, receivers and/or other devices forwarding the data as, for example, switches, routers, amplifiers, gateways and/or system couplers that are located along the transmission path.

Negative effects of such causes on the integrity of security-relevant data can therefore—as further described in the following—be essentially completely excluded.

The data packet illustrated in FIG. 1 comprises—as security-relevant data—a protocol- and/or application-specific user data block 11 and, in the present example, a check data block 12.

Depending on the application, such user data 11 is provided on the side of the sender particularly by sensors, actuators and/or control devices over one or two channels and transmitted to a defined receiver as, for example, an actuator or actuating drive of a protective barrier on the basis of the overall structure of the transmission system which may comprise ring-, line-, star- and/or tree-shaped network and/or bus structures. Such user data 11 therefore often comprise pure input/output data. Fields of application of transmission systems where such user data 11 partly or to its full extent represents security-relevant data are consequently particularly found in the fields of the manufacturing industry, public transport, fuel engineering, process industry, or building control technology.

In addition to the pure input/output data 11, check data 12 and/or additional secure or insecure data as, for example, control data, or a sequence number 12b as shown in FIG. 2 are often generated for process control. This additional data essentially enables, for example, the communication participants to verify the proper function of other participants, especially via checking the transmission path over signal chains by exchanging the relevant check data blocks 12.

Data packet 2 completes the security-oriented message and comprises a redundant information 21 that is allocated to the information content of data packet 1, i.e. a data securing value 21 that is based on the user data 11 and the check data 12.

The data securing value 21 contained in data packet 2 is expediently a check sum CRC calculated over the user data 11 and the check block 12 which is generated on the side of the sender using adapted driver-like means, in particular a microprocessor or similar programmable circuit design, on the basis of an error-checking algorithm, e.g. in the form of a generally known 'Cycle Redundancy Check'.

On the side of the receiver or at a defined processing location, the partial messages 1 and 2 are read out particularly by slave users and/or a master user that are arranged depending on the application and then verified for an error-free transmission by checking the redundant information 21 with respect to the security-relevant data 11 and 12, before the security-relevant user data 11 is passed on to the corresponding output users as, for example, an actuator to actuate the same.

As data packets to be transmitted principally always comprise the same number of bits for protocol-specific reasons, the data packet 1 comprising the security-relevant data (which in the present example is the user data 11 and additionally the check data 12) and the data packet 2 (comprising the check sum 21) also have the same bit length n.

Consequently, the user data rate (i.e. the relation between the useful data length and the overall data length, of a security-oriented message structured according to the invention) is considerably higher if compared to a security-oriented message. As shown in the security-oriented message in FIG. 3, each data packet 3 and 3' includes both the security-relevant data, (i.e. in particular the user data), and a data protection value based on the security-relevant data. These two elements are differently encoded.

Based on the embedding of the security-relevant data 11, 12 and the redundant information 21 in two different data packets 1 or 2 it is only necessary to generate a data protection value 21, and the invention thus allows to save one data protection value compared to the transmission of security-relevant data according to the state of the art (FIG. 3).

To guarantee a high level of error protection for the sending and/or forwarding of security-relevant data by insecure slave users and/or an insecure master in addition to the enhanced user data rate with the transmission of a security-relevant data set comprising only a small volume of user data 11, the data protection value 21 that consequently has an increased number of bits is particularly effective.

For this purpose, the data protection value 21, i.e. in particular the CRC polynomial or the error-checking algorithm used for the generation of a check sum, is preferably chosen such that each of the $2^n$ possible data protection values results from exactly one of the $2^n$ combinations of the security-relevant data. Therefore, both data packets 1 and 2 of the security-oriented message comprise essentially the same information, but are differently encoded.

For practical use, with an appropriate generation of the redundant information 21, a very high Hamming distance is therefore provided, and a good protection against error bursts, inversion of individual components of the data of the security-oriented message, and a good detection of errors, in particular also of systematic errors through the different partial messages 1 and 2—as is detailed in the following with reference to FIG. 2—is guaranteed.

Referring to FIG. 2, where a security-oriented message is made up of two data packets 1b and 2b each comprising 24 bits, the particularly good detection of systematic errors based on the invention becomes particularly clear. Here, the data packet 1b including the security-relevant data comprises two areas—one user data area 11b with 16 bits and one area 12b with 8 bits for the transmission of a sequential number.

If, for example, the process or input/output data to be secured, i.e. the user data 11b comprising 16 bits, do not change only the sequential number in the data area 12b' increments during an application. If the checking polynomial 21b has been appropriately chosen, a whole series of bits in the most different positions will change within the large check sum 21 comprising 24 bits. These high dynamics of the messages thus allows the particularly easy detection of systematic errors in the devices forwarding the security-oriented messages guaranteeing the highest level of security.

Application-specific or based on the respectively used network and/or bus, the invention furthermore guarantees that the two partial messages 1 and 2 forming a security-oriented message are combined and jointly transmitted also within a predefined (superset) frame structure.

However, it must be principally pointed out that the two allocated to each other partial messages 1 and 2 may also be transmitted separately—for example, over separate connections or time-delayed over a single connection. Furthermore, the invention guarantees that the allocated to each other partial messages 1 and 2 may also be embedded and transmitted within different predefined (superset) frame structures. For this purpose, it is for practical reasons provided that the individual packets are given an addressing block and/or an identification code for their logical allocation so that the readout, allocation and verification for an error-free transmission of received data can essentially also be performed independently from the time-related transmission and/or the type of transmission of the allocated to each other partial messages 1 and 2.

The invention thus allows the transmission of security-relevant data with a high user data rate over essentially any insecure media without giving up the required security. As an example the Interbus is referred to as a preferred transmission medium for the application of the invention where secure data with a low volume of user data is sent and/or forwarded by insecure users and/or the insecure master.

What is claimed is:

1. A process for the packet-oriented transmission of security-relevant data under application of at least one security-oriented message consisting of a first data packet and an allocated second data packet, and at least one transmission system with a parallel and/or serial network and/or bus system with at least one communication participant connected to it, the process, comprising:
    transmitting the security-relevant data and redundant information based on the security-relevant data within the at least one security-oriented message,
    wherein the security-relevant data and the redundant information each comprise the user data and the check data;
    wherein, for each security-oriented message, the security-relevant data is transmitted in the first data packet and the redundant information, based solely on all the security-relevant data of the first data packet, is transmitted in the allocated second data packet of the at least one security-oriented message,
    wherein the check data enables the communication participant to verify the proper function of the other communication participants via checking a transmission path over signal chains by exchanging the check data, and
    wherein the security-relevant data is provided by a device selected from the group consisting of a sensor, an actuator, a control device, and any combinations thereof.

2. The process according to claim 1, wherein the redundant information is encoded.

3. The process according to claim 1, wherein the redundant information is a check sum (CRC) calculated over the security-relevant data.

4. The process according to claim 1, wherein the check data comprises a sequence number that increments during application.

5. The process according to claim 1, further comprising transmitting several packets within a predefined superset frame structure.

6. The process according to claim 5, wherein the packets within a predefined superset frame structure include the security-relevant data and the redundant information that are allocated to each other.

7. The process according to claim 1, wherein the packets with the security-relevant data and the redundant information that are allocated to each other are transmitted in a parallel or serial way.

8. The process according to claim 1, wherein the packets with the security-relevant data and the redundant information that are allocated to each other are transmitted in strings or separately.

9. The process according to claim 1, wherein the packets include an addressing block and/or an identification code for their logical allocation.

10. A device for a transmission system with at least one parallel and/or serial network and/or bus system, for the packet-oriented transmission of security-relevant data under application of at least one security-oriented message consisting of a first data packet and an allocated second data packet, the device comprising:
   means, arranged on the side of the sender, for the packet-oriented embedding of the security-relevant data from a device selected from the group consisting of a sensor, an actuator, a control device, and any combinations thereof into the first data packet and for the packet-oriented embedding of each allocated redundant information, based solely on all the security-relevant data of the first data packet, into the allocated second data packet of the security-oriented message such that security-relevant data and the allocated redundant data each comprise user data and check data, wherein the check data enables communication participants to verify proper function of one another via checking a transmission path over signal chains by exchanging the check data.

11. The device according to claim 10, further comprising an encoding device for the encoding of the redundant information.

12. The device according to claim 10 wherein the means for embedding are allocated means for the generation of the redundant information with the same number of bits (n) as the security-relevant data to be transmitted.

13. The device according to claim 10 wherein the means for the generation and/or embedding are designed such that any possible combination of the security-oriented data of a packet unambiguously results in exactly one of the possible combinations within the packet having the respective allocated redundant information.

14. The device according to claim 10, further comprising means arranged on the side of the receiver for the verification of an error-free data transmission based on the security-relevant data embedded in at least one packet and the allocated redundant information, wherein each redundant information based on the security-relevant data of a respective one packet is embedded in a separate packet.

15. The device according to claim 14 wherein the means for the verification are allocated means for reading out and allocating security-relevant data and allocated redundant information received in different packets.

16. The device according to claim 10, wherein several packets with the security-relevant data and/or the allocated redundant information are capable of being transmitted within a predefined superset frame structure.

17. The device according to claim 10, further comprising means for the packet-oriented embedding and readout of addressing blocks and/or identification codes for the logical allocation of individual packets and/or their contents to each other.

18. The device according to claim 10, wherein the means are allocated to slave devices and/or a master device.

19. A transmission system comprising:
   at least one parallel and/or serial network and/or bus system; and
   at least one device according to claim 10.

20. The transmission system according to claim 19, wherein the network and/or bus system is at least one ring-, line-, star- and/or tree-shaped network and/or bus structure.

21. The transmission system according to claim 19, wherein the at least one parallel and/or serial network and/or bus system comprises an Interbus system.

22. A process for the transmission of a security-oriented message, comprising:
   generating, at a sending side by a device selected from the group consisting of a sensor, an actuator, a control device, and any combinations thereof, a first data packet comprising a block of user specific data and a block of check data;
   calculating, at the sending side via a processor, a single cyclic redundancy check code for the block of user specific data and the block of check data;
   generating, at the sending side, a second data packet comprising the single cyclic redundancy check code;
   transmitting, over an unsecured bus or network, the first and second data packets; and
   exchanging the check data between communication participants to allow the communication participants to verify proper function of each other by checking a transmission path over signal chains.

23. The process according to claim 22, further comprising combining and jointly transmitting the first and second data packets within a frame structure.

24. The process according to claim 22, further comprising transmitting the first and second data packets within different frame structures.

25. The process according to claim 22, wherein the step of transmitting the first and second data packets comprise separately transmitting the first and second data packets.

* * * * *